Aug. 9, 1938.     C. DOERING     2,125,994
OUTDOOR ADVERTISING DEVICE
Filed May 3, 1937     3 Sheets-Sheet 1

INVENTOR.
CHARLES DOERING
BY Harry C. Hunter
ATTORNEY.

Aug. 9, 1938.  C. DOERING  2,125,994
OUTDOOR ADVERTISING DEVICE
Filed May 3, 1937   3 Sheets-Sheet 2
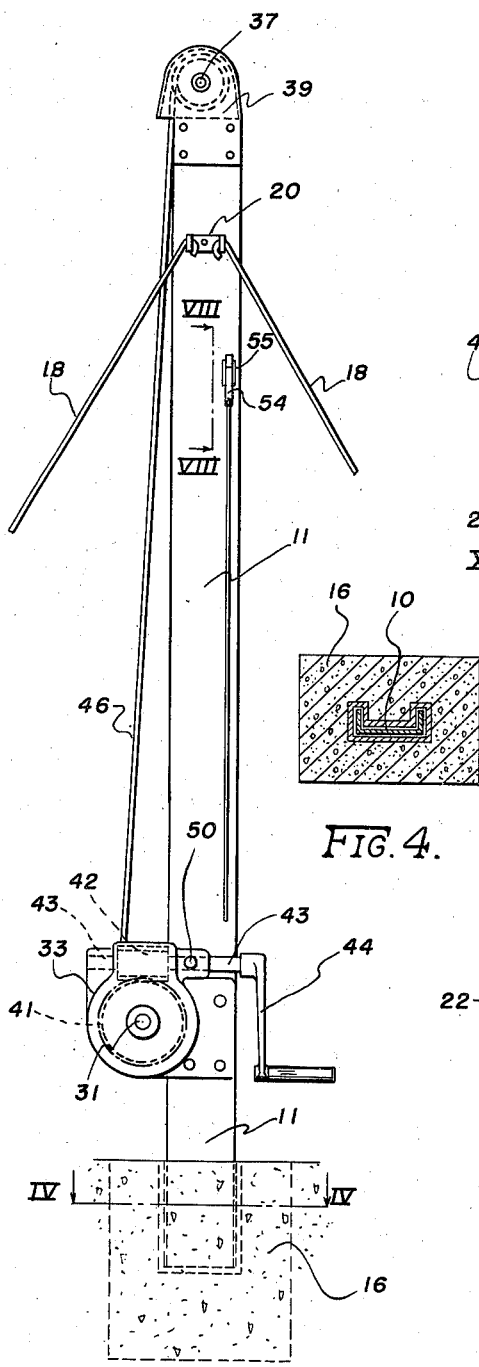
FIG. 2.
FIG. 4.
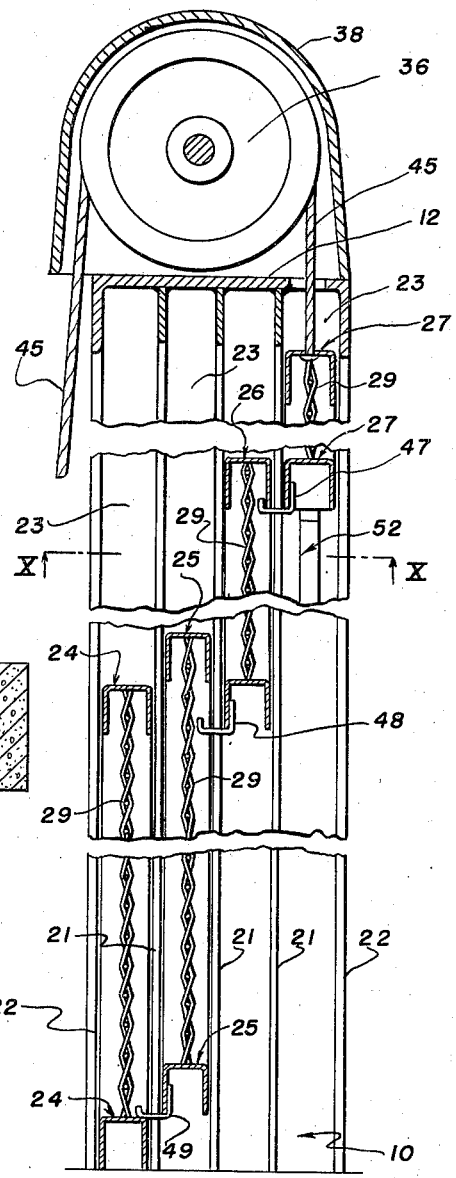
FIG. 3.
INVENTOR.
CHARLES DOERING
BY
ATTORNEY.

Aug. 9, 1938.  C. DOERING  2,125,994
OUTDOOR ADVERTISING DEVICE
Filed May 3, 1937    3 Sheets-Sheet 3
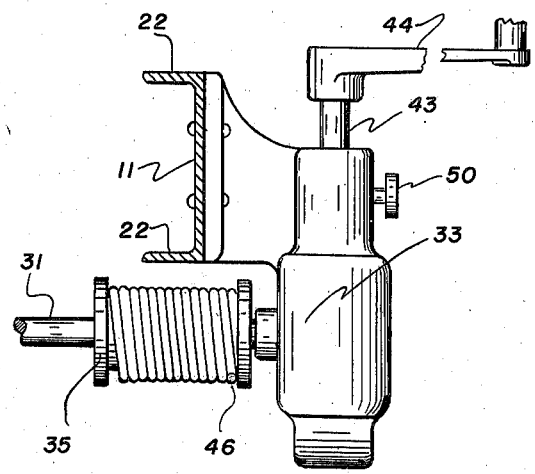
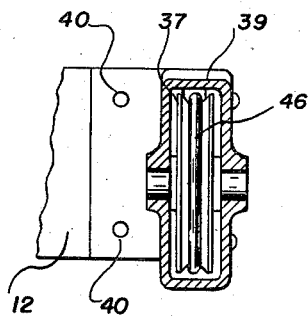
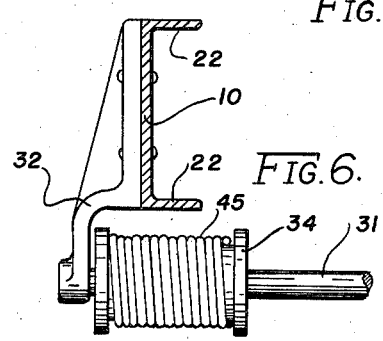
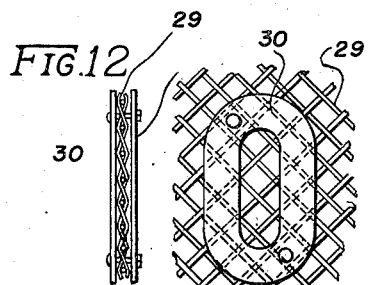
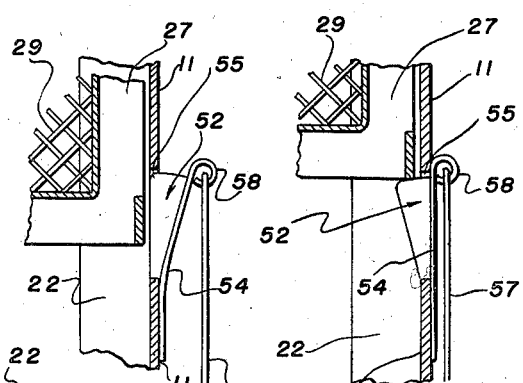
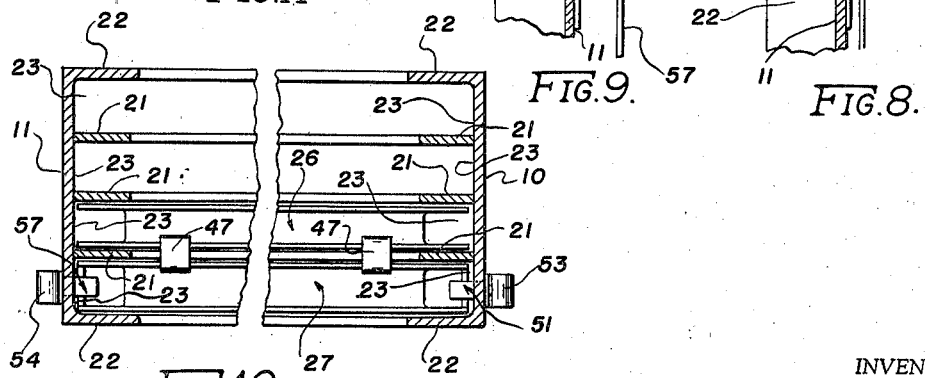
INVENTOR.
CHARLES DOERING.
BY
ATTORNEY.

Patented Aug. 9, 1938

2,125,994

UNITED STATES PATENT OFFICE 2,125,994

OUTDOOR ADVERTISING DEVICE

Charles Doering, Chicago, Ill.

Application May 3, 1937, Serial No. 140,327

15 Claims. (Cl. 40—65)

This invention relates to advertising display devices and more particularly to outdoor advertising sign display mechanisms, although certain features thereof may be employed with equal advantage for other purposes.

It contemplates more especially the provision of improved outdoor advertising display means for increasing the effect and enlarging the capacity of outdoor advertising devices without occupying any appreciable ground space.

Numerous types of advertising devices have heretofore been proposed for outdoor use, but these occupy appreciable space compared to the capacity thereof to sustain advertising displays and otherwise are lacking in sustaining the advertising surface thereof in an effective position for vision by the passing public. Outdoor advertising devices are usually positioned in places where ground space is an important consideration and where effectiveness in display is essential in order to warrant the expense incident thereto. Then, too, such advertising devices prove exceedingly expensive both in maintenance and ground rental expense unless the advertising capacity thereof is appreciably increased without detracting from the effectiveness thereof.

The increasing number of outdoor advertising signs renders it necessary to conserve ground space and increase the capacity of signs compared to the ground space requirement and to facilitate access thereto for maintenance, cleaning and advertising change purposes without the requirement for special equipment to elevate workmen to the sign surfaces whenever servicing is necessary. This is accomplished by providing a plurality of sign sections in coordinated association for relative displacement to extended or collapsed positions for providing large advertising capacity and convenient accessibility even though erected adjacent a building, on building roofs or on the ground surface.

One object of the present invention is to simplify the construction and improve the operation of devices of the character mentioned.

Another object is to provide an improved advertising device that has an appreciably larger advertising capacity and requires no additional ground space than outdoor advertising devices of substantially less capacity.

Still another object is to provide an improved outdoor advertising device of comparatively large capacity and presenting negligible wind resistance.

A further object is to provide an advertising device with a plurality of adjacent surface members mounted for relative displacement to occupy extended or collapsed positions relative to each other.

A still further object is to provide a plurality of moveable surface members disposed in stepped relationship to provide an advertising device of substantially increased capacity that affords convenient access for servicing purposes.

Still a further object is to provide a plurality of relatively adjustable surface members disposed in vertically stepped relationship to provide an advertising device of substantially increased capacity and readily accessible for servicing purposes.

An additional object is to provide a plurality of relatively moveable surface members disposed in vertically stepped relationship in combination with mechanism for adjusting the relative positions of the component surface members for convenient advertising mounting purposes.

Other objects and advantages will appear from the following description of an illustrative embodiment of the present invention.

In the drawings:

Figure 2 is a side view in elevation of the device shown in Figure 1.

Figure 3 is a fragmentary sectional view taken substantially along line III—III of Figure 1.

Figure 4 is a sectional view taken substantially along line IV—IV of Figure 2.

Figure 5 is a fragmentary sectional view taken substantially along line V—V of Figure 1.

Figure 6 is a fragmentary sectional view taken substantially along line VI—VI of Figure 1.

Figure 7 is a sectional view of a sheave taken substantially along line VII—VII of Figure 1.

Figure 8 is a fragmentary sectional view taken substantially along line VIII—VIII of Figure 2.

Figure 9 is a sectional view similar to Figure 8 with an advertising surface member in somewhat lowered position and its supporting trip disengaged.

Figure 10 is an enlarged sectional view taken substantially along line X—X of Figure 3.

Figure 11 is a fragmentary view of a surface member showing the construction of a useable type for advertising purposes.

Figure 12 is a fragmentary end view in elevation of the partial surface member shown in Figure 11.

Figure 1:
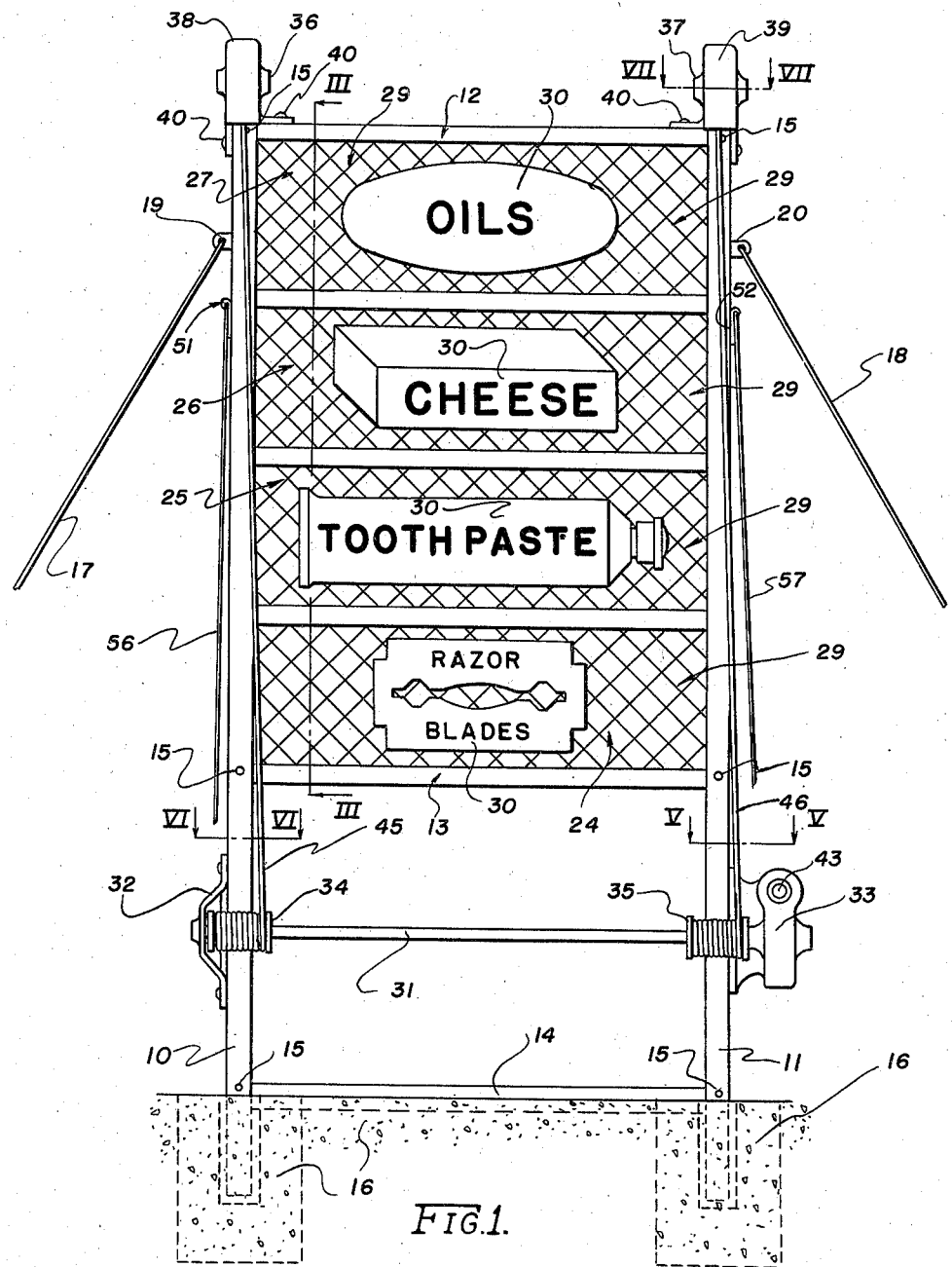
Figure 1 is a front view in elevation of an advertising device embodying teachings of the present invention, with the surface members being extended relative to each other in their extreme upward position.

The structure selected for illustration comprises a pair of vertically disposed confronting channel members 10 and 11 of such length and cross-section as may be desired or required to sustain a plurality of surface advertising members in superposed relation. The height of the channel members 10 and 11 depends upon the capacity of the advertising unit, and the cross section thereof is a factor of the requirement for strength in sustaining the advertising members in their superposed extended or collapsed relation. The confronting channel members 10 and 11 are maintained in the desired spaced position by means of cross members 12, 13 and 14 which are anchored or otherwise attached thereto in any suitable manner such as by welding or resort to rivets 15 to define the rigid frame or superstructure 10—11.

The frame or superstructure 10—11 is preferably anchored or imbedded in concrete 16 that serves as a foundation or base therefor so as to sustain such in vertically erect position relative to the ground surface or upon the building structure. As shown, the lowermost cross member 14 of the frame members 10—11 is partially imbedded in the concrete 16 so as to serve as an anchor and to provide a more effective support for the entire superstructure 10—11. Where the frame 10—11 is anchored or attached to the roof or top wall of a building structure, other expedients of attachment for vertically erect support may be resorted to as particular installations may warrant.

Should the height of the superstructure 10—11 be of such an extent as to warrant or require auxiliary support, a plurality of guys such as steel rods 17—18 are anchored at one extremity thereof to brackets 19 and 20 fixed to the lateral surface of the channel members 10 and 11 proximate to the top edge thereof. The guys 17 and 18 diverge from the brackets 19 and 20 (Figure 2) for attachment at their other extremities to the ground, roof or other building structure surface so as to steady the frame or superstructure 10—11 and preclude the shifting thereof responsive to the influence of wind or other forces.

The confronting substantially U-shaped surfaces of the frame members 10—11 are provided with a plurality of vertically disposed confronting ridges 21, in this instance three, which are spaced in parallelism to each other and the exterior channels 22 defining the sides of the frame members 10 and 11 (Figure 3). The ridges 21 extending from the interior surfaces of the channel members 10—11 and define vertical runways 23, in this instance four, on each of the channel members 10 and 11 to receive and guide therebetween a plurality of surface advertising members or frames 24, 25, 26 and 27, in this instance four. The surface members or advertising frames 24 to 27 are capable of vertical displacement in the runways 23 so as to be in relative extended relation (Figure 1) or collapsed (Figure 3) as will appear more fully hereinafter.

The surface members or advertising frames 24, 25, 26 and 27 may be of varied construction and design depending upon the dictates of commercial practice and the particular type of advertising matter to be inscribed thereon. In the present embodiment, however, the advertising frames 24 to 27 consist of a channelled exterior frame defining a rectangular frame 28 to which any desired surface member may be attached to sustain advertising. In the present embodiment, the advertising surface consists of expanded metal or interwoven cross wires 29 that are anchored to the frames 24 to 27 so as to sustain any suitable form of advertising 30 (Figures 1, 11 and 12).

The preferred expanded members or interwoven cross-wires may prove advantageous in instances requiring the installation of the superstructure 10—11 upon the roof of a building so as to offer the minimum resistance to wind and other forces that would tend to impart a shifting urge to the frame structure 10—11. It is worthy of note that the advertising frames 24, 25, 26 and 27 are each disposed in separate runways 23 and are capable of being displaced relative to each other so that they may be extended or collapsed to their operative extended or inoperative collapsed positions as will appear more fully hereinafter.

To this end, the lowermost advertising frame 24 is sustained by the cross member 13 which is sufficiently close to the ground or supporting surface 16 to enable convenient access thereto for the purpose of changing the advertising matter 30 thereon as conditions may require from time to time. The advertising 30 may be associated with the surfaces of the frames 24, 25, 26, and 27 on both sides thereof so that such can be viewed from either side of the advertising frame, since such is erected in elevated position so as to preclude obstruction by building structures. The frames 24 to 27 are usually so exposed beyond the customary obstruction so that both sides serve to sustain advertising indicia 30 to great advantage and substantially increase advertising capacity. The lowermost advertising frame 24 is preferably though not essentially mounted so as to be stationary relative to the other advertising frames 25, 26 and 27 that are capable of displacement to an extended or collapsed position relative to the initial or stationary advertising frame unit 24.

In order to displace or vary the relative positions of the advertising frames 24, 25, 26 and 27 so that they may be maintained, extended (Figure 1) or collapsed relative to each other (Figure 3) to afford mounting of advertising upon the exterior flat surfaces thereof, actuating instrumentalities are provided for mounting to the superstructure 10—11. To this end, a shaft 31 (Figure 1) is journalled in bearing brackets 32 and 33 that are attached to the channel members 10 and 11, respectively, proximate to the sustaining surface 16 of the super-structure 10—11 so as to be readily accessible to an attendant without the requirement to climb or use a ladder in effecting the displacement of the advertising frames 24 to 27.

As shown, the shaft 31 has a pair of cylindrical sheaves or drums 34 and 35 attached thereto for rotation therewith. The drums 34 and 35 are attached to the shaft 31 in alignment with the channel members 10—11 so as to cooperate with sheaves or pulleys 36 and 37 mounted in housings 38 and 39, respectively, (Figures 1 and 7) fixed to the top extremities of the channel members 10 and 11 by any suitable fastening expedient such as the rivets 40. The bearing bracket 33 of the shaft 31 constitutes, in this instance, a gear housing for confining a worm wheel 41 that is fixed to the shaft 31 (Figure 2) for meshing engagement with a worm 42 fixed to another driving shaft 43.

The driving shaft 43 is journalled to the gear housing 33 and projects therefrom to carry a handle crank 44 that is fixed to the extremity of the shaft 43. In consequence thereof, rotation of the shaft 31 at a substantially reduced speed but with a correspondingly increased power factor so as to wind or unwind flexible cables 45 and 46. The cables 45 and 46 are anchored to the sheaves or drums 34 and 35, respectively, in winding relation with the exterior cylindrical surface thereof so as to operate the flexible cables 45 and 46 over the idler sheaves or pulleys 36 and 37 mounted on the tip of extremities of the channel members 10 and 11.

The other extremities of the flexible cables 45 and 46 are anchored to the top advertising frame 27 (Figure 3) so that the winding or unwinding of the flexible cables 45 and 46 on the drums 34 and 35 will raise and lower, respectively, the uppermost advertising frame 27. The actuation of the crank handle 44 causes the uppermost advertising frame 27 to respond thereto owing to the flexible cables 45 and 46 that frictionally engage the peripheries of the drums 34—35 and extend over the periphery of the idler sheaves or pulleys 36 and 37 fixed to the top extremities of the vertical channel members 10 and 11.

In order to render the intermediate advertising frames 25 and 26 operative responsive to the winding or unwinding of the flexible cables 45 and 46 directly responsive to the displacement of the uppermost advertising frame 27, the lower side of the advertising frame 27 is provided with substantially J-shaped brackets 47, in this instance two, (Figures 3 and 10) that are anchored to the lower edge of the frame 27 so as to be displaced in the path of the upper side of the next adjacent frame 26 to effect their inter-engagement so that the elevated displacement of the frame 27 will cause corresponding displacement of the next successive frame 26 when they are disposed in stepped relation and extended for substantially their full length relative to each other.

Similarly, the lower side of the advertising frame 26 is provided with a plurality of J-shaped brackets 48 so as to be disposed in the path of the upper side of the frame 25 (Figure 3) to effect the engagement thereof as the frame 26 is elevated by the frame 27 so that they will be extended for substantially their full length and maintained in extended operative relation responsive to winding the flexible cables 45 and 46 upon their drums 34 and 35 to almost an extreme extent which will bring the uppermost advertising frame 27 to a position very proximate to the top of the superstructure 10—11. The latter is so proportioned that all of the advertising frames 24, 25, 26, and 27 will be extended to substantially their full length and expose the advertising 30 mounted thereon for view by the passing public.

In order to limit the extension of the advertising frame members 24, 25, 26, and 27 so that one will not be separated from the other, the lower side of the frame unit 25 is provided with corresponding substantially J-shaped brackets 49 that are disposed in the path of the upper side of the frame 24 so as to effect engagement thereof in their extreme extended relative positions, since the lowermost frame 24 is preferably anchored against movement and will serve as a stop or limit as the brackets 49 drop against the upper side of the advertising frame 24. In consequence thereof, the advertising frames 24, 25, 26 and 27 will always be maintained in predetermined extended relationship (Figure 1) and their accidental descent to their collapsed relative position is precluded by any suitable means such as a stop pin 50 projecting through the gear housing 33 (Figure 2) and effecting registry with a correspondingly shaped aperture provided in the driving or handle crank shaft 43.

In order to maintain the advertising frames 24, 25, 26 and 27 in their extended operative position without the flexible cables 45 and 46 maintaining their weight, any suitable trip such as confronting lugs 51 and 52 (Figures 1, 8, 9 and 10) may be mounted on flat springs 53 and 54 so as to project through correspondingly shaped slots 55 (Figures 8 and 9) to normally assume a position in the path of the lower side of the uppermost advertising frame 27 responsive to the inward urge imparted thereto by means of the flat springs 53 and 54. To this end, the extremities of the flat springs 53 and 54 are attached by welding or otherwise to the edge of the channel members 10 and 11 to serve as a resilient spring mount for the trips or lugs 51 and 52.

When the advertising frame 27 is in its extreme upper position, the lugs 51 and 52 will be disposed beneath the lower side of the frame 27 (Figure 8) and serve to sustain the frame units 25, 26 and 27 owing to the inter-connection thereof by their respective substantially J-shaped brackets 47 and 48. This will relieve the tension on the flexible cables 45 and 46 while the sign units 24 to 27 are in their extended positions.

In order to release the uppermost advertising frame 27 from support by the trips 51 and 52, flexible cables 56 and 57 are anchored to the uppermost extremities of the trip mounts 53 and 54 which are curled to present eyelets 58 for that purpose. The eyelets 58 afford the convenient attachment of the flexible ropes 56 and 57 that extend to the ground or other supporting surface of the superstructure 10—11. The ropes 56 and 57 enable the attendant to exert a pull thereon to remove the trips 51 and 52 from their operative sustaining position in the path of the uppermost advertising frame 27.

It is worthy of note that the substantially J-shaped brackets 47, 48 and 49 serve to interconnect the frames 24 to 27 to successively engage each other in elevating the advertising units 27, 26 and then 25 relative to each other and to the lowermost stationary frame 24 so as to slightly overlap and present the advertising matter 30 for view by the public. The inter-connecting expedients 47, 48 and 49 are rendered inoperative as each of the frames 25, 26 and 27 arrive at a position immediately above the lowermost stationary unit 24.

In consequence thereof, it will be seen that the inter-connecting brackets 47, 48 and 49 are operative in the successive ascent of the frame members 27, 26 and 25 as well as in the successive descent of the frame members 25, 26 and 27. Should commercial practice so dictate, the lowermost normally stationary advertising unit 24 can be inter-connected to the remaining advertising units so as to be moveable therewith as such become extended when the advertising indicia 30 associated with each unit is exposed for view.

For that matter, the advertising units 25, 26 and 27 may all be collapsed to assume a confronting position in horizontal alignment with the lowermost advertising unit 24. In order to attain this end the substantially J-shaped brackets 49 may be entirely omitted or displaced from the path of the lowermost advertising frame 24, thereby permitting the adjacent advertising frames 25, 26 and 27 to be lowered in horizontal alignment with the lowermost advertising surface member or frame 24.

With the arrangement of parts above described, it will be apparent that the uppermost advertising frames 25, 26 and 27 may be successively lowered preferably to a position just above the lowermost advertising frame 24 so that the advertising 30 inscribed thereon or attached thereto may be successively changed on each frame 25, 26 and 27 without requiring the attendant to climb to the topmost position on the extended superstructure 10—11. This is important in that the superstructure 10—11 may, in some instances, be of great height to provide an appreciable advertising capacity.

Should there be any occasion to place advertising on the frames 24 to 27 or climatic conditions require that such be collapsed relative to each other in order to avoid the shifting or destruction thereof during storms, the advertising frames 25, 26 and 27 may be lowered to their inoperative collapsed position as conditions may require or when such is advantageous to preclude any possible injury thereto. Then, too, the collapsing thereof affords complete advertising changes without entailing much labor or subjecting the attendant to the danger inherent in climbing to great heights on such structures. It should be appreciated that any number of uprights 1—11 may be spaced horizontally for rigid connection into a self-contained unit to double, triple or quadruple series of sign units 24, 25, 26 and 27 responsive to a common or independent actuator 44. A power source such as an electric motor may be connected to the actuator 44 should commercial practice so dictate and the power required is such as to make hand operation impractical.

Various changes may be made in the embodiment of the invention herein specifically described without departing from or sacrificing any of the advantages of the invention or any features thereof, and nothing herein shall be construed as limitation upon the invention, its concept or structural embodiment as to the whole or any part thereof except as defined in the appended claims.

I claim:

1. In an advertising device of the character described, the combination with a frame, of a plurality of vertically stepped flat surface members associated with said frame, said surface members being mounted in predetermined spaced relation relative to each other, means for rendering said surface members responsive to each other at a predetermined distance of relative displacement, and means for displacing said surface members relative to each other.

2. In an advertising device of the character described, the combination with vertically disposed confronting frame members, of a plurality of flat surface members associated with said frame, said surface members being moveably associated with said frame in overlapping relationship relative to each other, means for rendering said surface members responsive to each other at a predetermined distance of relative displacement, and means for adjusting the relative position of said surface members for the purposes set forth.

3. In an advertising device of the character described, the combination with a frame, of a plurality of rectangular advertising surface members associated with said frame for movement along a predetermined path, said surface members being disposed in overlapping relationship to each other for relative extension or collapsing, means for rendering said surface members responsive to each other at a predetermined distance of relative displacement, actuating means for adjusting the relative position of said surface members, and means for supporting said surface members independent of said actuating means.

4. In an advertising device of the character described, the combination with a frame, of a plurality of flat surface members associated with said frame for movement along a predetermined path, said surface members being disposed in overlapping relationship relative to each other, means for interconnecting said surface members so that one is responsive to the other, means connected to one of said surface members to effect their displacement relative to each other, means for sustaining said surface members in their fully extended position, and means for releasing said sustaining means.

5. In an advertising device, the combination with vertically disposed confronting channel members, of a plurality of advertising frames mounted in said channel members in lateral spaced relation, sheaves mounted on said channel members, means for rendering said surface members responsive to each other at a predetermined distance of relative displacement, flexible cables extending over said sheaves and anchored to one of said frame members, and means for varying the effective length of said cables to elevate and lower the frame member to which said cables are anchored.

6. In an advertising device, the combination with vertically disposed confronting channel members, of a plurality of advertising frames mounted in said channel members in lateral spaced relation, means for rendering said surface members responsive to each other at a predetermined distance of relative displacement, sheaves mounted on said channel members, flexible cables extending over said sheaves and anchored to one of said frame members, means for varying the effective length of said cables to elevate and lower the frame member to which said cables are anchored, and means for operatively connecting said last named frame member to certain of the other frame members to effect their relative displacement.

7. In an advertising device of the character described, the combination with a stationary advertising frame member, of a plurality of adjacently disposed moveable advertising frame members, means for rendering said surface members responsive to each other at a predetermined distance of relative displacement, and means for displacing said last named frame members to an operative extended or inoperative collapsed position relative to each other.

8. In an advertising device of the character described, the combination with a stationary advertising frame member, of a plurality of adjacently disposed moveable advertising frame members, means for rendering said surface members responsive to each other at a predetermined distance of relative displacement, and means for displacing one of said last named frame members to an operative extended or inoperative collapsed position relative to each other.

9. In an advertising device of the character described, the combination with a stationary advertising frame member, of a plurality of adjacently disposed moveable advertising frame members, interconnecting means for said last named frame members, and means for displacing one of said last named frame members to an operative extended or inoperative collapsed position relative to each other.

10. In an advertising device of the character described, the combination with a stationary advertising frame member, of a plurality of adjacently disposed moveable advertising frame members, interconnecting means for said last named frame members, and means for displacing one of said last named frame members to an operative extended or inoperative collapsed position relative to each other, said interconnecting means being rendered inoperative when said moveable frame members assume a predetermined collapsed position relative to each other.

11. An adjustable advertising device of the character described, the combination with elongated vertical confronting uprights, of a plurality of vertical runways in said uprights, a plurality of advertising units disposed in said runways for guided displacement therein, means for rendering said surface members responsive to each other at a predetermined distance of relative displacement, and actuatable means for raising and lowering said advertising units in said runways for effecting the relative displacement thereof between operative extended and inoperative collapsed positions responsive to said actuatable means.

12. An adjustable advertising device of the character described, the combination with elongated vertical confronting uprights, of a plurality of vertical runways in said uprights, a plurality of advertising units disposed in said runways for guided displacement therein, means for rendering said surface members responsive to each other at a predetermined distance of relative displacement, actuatable means for raising and lowering said advertising units in said runways for effecting the relative displacement thereof between operative extended and inoperative collapsed positions responsive to said actuatable means, and means for sustaining said advertising units in operative relatively extended position independent of said last named means.

13. An adjustable advertising device of the character described, the combination with elongated vertical confronting uprights, of a plurality of vertical runways in said uprights, a plurality of advertising units disposed in said runways for guided displacement therein, actuatable means connected to one of said advertising units, and means interposed between said advertising units for raising and lowering said advertising units in said runways for effecting the relative displacement thereof between operative extended and inoperative collapsed positions responsive to said actuatable means.

14. An adjustable advertising device of the character described, the combination with elongated vertical confronting uprights, of a plurality of vertical runways in said uprights, a plurality of advertising units disposed in said runways for guided displacement therein, actuatable means connected to one of said advertising units, and means interposed between said advertising units for raising and lowering said advertising units in said runways for effecting the relative displacement thereof between operative extended and inoperative collapsed positions responsive to said actuatable means, said actuatable means including a crank arm, a drum connected to said crank arm, and a flexible cable interposed between said drum and one of said advertising units.

15. An adjustable advertising device of the character described, the combination with elongated vertical confronting uprights, of a plurality of vertical runways in said uprights, a plurality of advertising units disposed in said runways for guided displacement therein, actuatable means connected to one of said advertising units, means interposed between said advertising units for raising and lowering said advertising units in said runways for effecting the relative displacement thereof between operative extended and inoperative collapsed positions responsive to said actuatable means, said actuatable means including a crank arm, a drum connected to said crank arm, a flexible cable interposed between said drum and one of said advertising units, and means for sustaining said advertising units in extended relation independent of said actuatable means.

CHARLES DOERING.